June 25, 1946.  J. W. RHODES  2,402,842
LOCKING DEVICE
Filed July 16, 1945
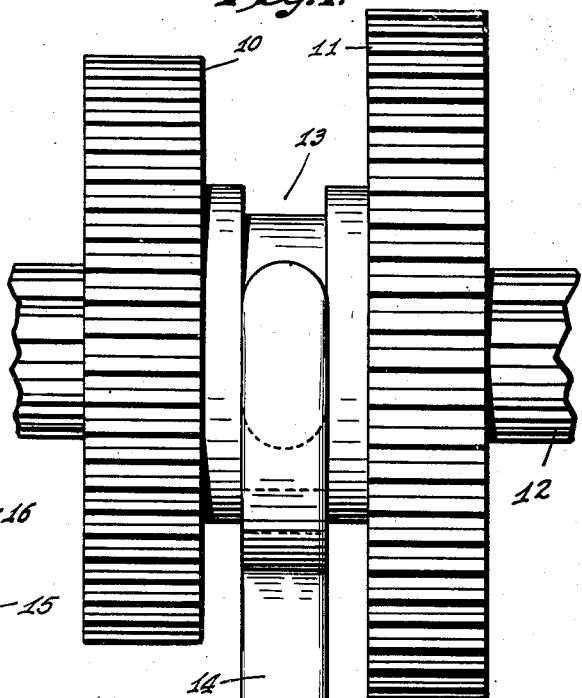
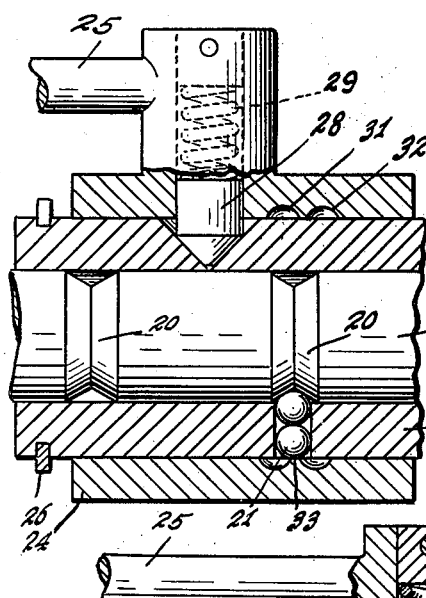
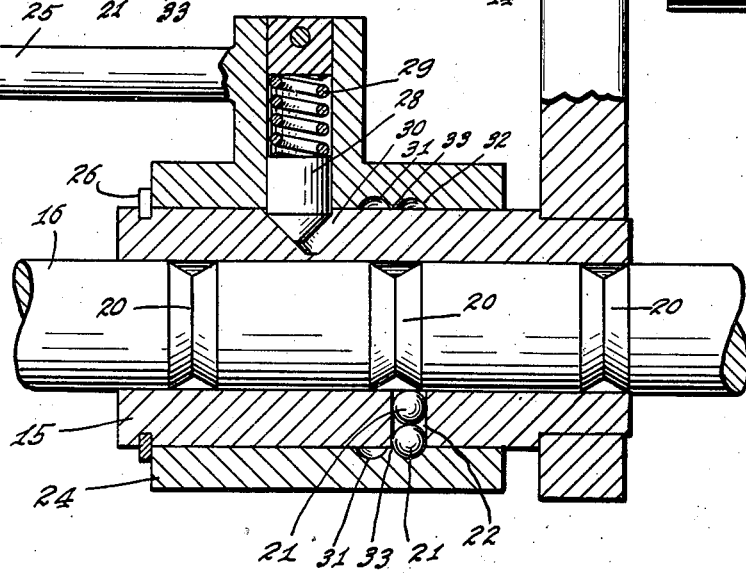
INVENTOR.
JOHN W. RHODES,
BY
ATTORNEYS.

Patented June 25, 1946

2,402,842

UNITED STATES PATENT OFFICE 2,402,842

LOCKING DEVICE

John W. Rhodes, Indianapolis, Ind., assignor to J. D. Adams Manufacturing Company, Indianapolis, Ind., a corporation of Indiana Application July 16, 1945, Serial No. 605,311

13 Claims. (Cl. 74—475).

My invention relates to a locking device by means of which a member longitudinally slidable on an appropriate guide rail between a plurality of predetermined positions, may be locked in any of such positions. It is the primary object of my invention to produce such a device which will positively lock the sliding member in any of its predetermined positions of adjustment but which will be automatically released when the member is to be shifted by a suitable control mechanism.

Another object of my invention is to produce a locking device which can be embodied in change-speed transmissions of the sliding gear type without the necessity for any extensive changes in construction, which will operate positively when engaged to prevent any movement of the gear or gears with which it is associated, but which will be automatically disengaged when the control mechanism of the transmission is operated to effect a gear-change and automatically re-engaged when the gear-change has been effected.

For convenience, I shall describe my invention herein as embodied in a change-speed transmission, but it is to be understood that the invention has other applications.

In carrying out my invention, I mount a gear-shifting fork for sliding movement on a stationary rail which is provided with a plurality of spaced annular grooves or recesses each adapted to receive a detent movable with the fork. The fork includes a hub portion, which receives the rail; and on such hub there is slidably mounted a sleeve which is longitudinally movable on the hub between two fixed limits. The sleeve is operatively connected to the gear-shift lever, or other means by which the gears are shifted, and is spring-biased to a position intermediate the limits of its movement relative to the fork-hub. The sleeve is provided with provisions co-operating with the detent to prevent removal of the latter from any groove in the rail until the sleeve has been moved in one direction or the other from its intermediate position on the fork-hub.

The accompanying drawing illustrates my invention: Fig. 1 is a fragmental elevation in partial section of a sliding-gear change-speed transmission mechanism showing the parts in the positions they occupy as a gear-change is being completed; and Fig. 2 is a fragmental section showing the parts in the positions they occupy upon completion of the gear-change.

The lock illustrated in the drawing is intended to control movement of a pair of transmission gears 10 and 11 rigid with each other and axially slidable as a unit along a splined shaft 12. The common hub of the two gears 10 and 11 is provided with an annular groove 13 which, in known manner, receives bosses on a shifter-fork 14. The shifter-fork is rigid with a fork-hub 15 longitudinally slidable on a rail 16 stationarily supported from the transmission housing (not shown).

The rail 16 is provided with a plurality of spaced grooves 20 with which there co-operates a detent carried by the hub 15. The detent may take any convenient form, that shown in the drawing comprising a pair of steel balls 21 mounted in a radial opening 22 extending through the wall of the hub 15. The grooves 20 are of course so located that the detent, engaging them, locates the gear-pair 10—11 in any of its positions of adjustment.

Slidably mounted on the hub 15 I provide a sleeve 24 adapted to be connected, as through a rod 25, with a gear-shift lever (not shown) or other means used in moving the gear-pair 10—11 from one position to another. Movement of the sleeve 24 on the hub 15 is limited to a predetermined extent, as by providing the hub with a split spring ring 26 spaced from the shifter-fork 14 by a distance somewhat greater than the length of the sleeve 24.

Means are provided for biasing the sleeve 24 to an intermediate position between the limits of its movement relative to the hub 15. As shown, this means takes the form of a pin 28 which is radially slidable in the sleeve 24 and which is urged inwardly thereof by a compression spring 29. The inner end of the pin 28 is conical in form and is adapted to be received in a conical depression 30 in the hub 15, the arrangement being such that any displacement of the sleeve from the position in which the pin 28 and depression 30 are alined will cause the pin to be forced outwardly against the pressure exerted upon it by the spring 29.

The sleeve 24 is provided interiorly with two recesses, shown as annular grooves 31 and 32, separated by a land 33. The land 33 is so located that it will be in line with the detent 21 when the sleeve 24 is in the intermediate position to which the spring-pressed pin 28 biases it; and the two grooves 31 and 32 are preferably so located that one or the other of them will be in line with the detent when the sleeve 24 is at one or the other limits of its movement relative to the hub 15.

As will be clear from the drawing, each groove 20 has inclined sides so that movement of the fork on the rail will tend to force the detent out of the groove. The same is true of the grooves 31 and 32; but in this instance, movement of the sleeve 24 on the hub 15 will tend to force the detent inwardly. This latter feature makes unnecessary a second spring to force the detent toward engaged position.

The parts are illustrated in Fig. 2 in the positions they respectively occupy when the gear-pair 10—11 is in one of its established positions of adjustment. In such a situation the spring 29 acting on the pin 28 causes the sleeve 24 to be held in its intermediate position relative to the hub 15. The land 33, being in line with the balls 21, holds the innermost ball seated in one of the grooves 20; and any tendency of the gear-pair 10—11 to move in either direction along the shaft 12 will be effectively resisted by the engagement of the inner ball 21 in the groove 20. When it is desired to effect a shifting of the gear-pair 10—11, the rod 25 is moved in the desired direction. As the detent engaged in the groove 20 prevents movement of the hub 15, movement of the rod 25 will slide the sleeve 24 on the hub 15. Assuming that the rod 25 is moved to the left, the sleeve 24 will move toward the ring 26 and the groove 32 will move toward alinement with the detent balls 21. Movement of the sleeve 24 on the hub 15 forces the pin 28 outwardly and compresses the spring 29 with the result that the hub 15 and the fork 14 are urged to follow the leftward movement of the rod 25. Preferably, the spring 29 is so proportioned that the pin 28, before reaching the outer limit of its movement, will exert on the wall of the depression 30 a force having an axial component greater than the resistance of the gear-pair 10—11 to movement along the shaft 12. If this is the case, movement of the sleeve 24 to the left will force the inner ball 21 against the left-hand side of the groove 20, which will urge the balls outwardly and cause the outer ball to enter the groove 32 in the sleeve 24 as such groove comes into alignment with the balls. When this occurs, the inner ball will be out of the groove 20 and the fork will be free to move to the left.

During the movement of the sleeve and fork to the left, the inner ball 21 is urged inwardly against the surface of the rail 16 by the action of the side wall of the groove 32 on the outer ball, such side wall being urged axially against the ball by the action of the spring 29 and pin 28. As the result, when the fork 14 approaches a position in which the balls 21 will be in alignment with the next groove 20, which condition is illustrated in Fig. 1, the inner ball 21 will be forced into such groove as the spring-pressed pin 28 urges the sleeve 24 and hub 15 toward their normal relative position. When this normal relative position is reached, the land 33 will again overlie the outer ball and will thus hold the fork 14 positively in its new position. If leftward movement of the rod 25 ceases, the parts remain in such position. However, if leftward movement of the rod 25 is continued, the series of actions above described is repeated until the balls reach alignment with the next succeeding groove 20.

If the spring 29 is not strong enough to produce movement of the gear-pair 10—11 when it is fully compressed, the balls 21 may remain in their innermost positions until the sleeve 24 engages the ring 26, whereupon the effort transmitted through the rod 25, directly applied to the fork, will move the latter to the left, the balls being forced outwardly by the inclined side wall of the groove 20. The spring 29, if not strong enough to overcome the resistance opposing axial movement of the gear-pair 10—11, should be strong enough to overcome any resistance to movement of the rod 25 and the parts which operate it, in order that the sleeve 24 may be restored to its normal position on the hub 15.

If the gear-pair 10—11 is to be moved to the right, the rod 25 is urged rightwardly and the above described sequence of operations takes place, but in the reverse direction.

It is to be noted that the lock described is positive in operation and is releasable by normal gear-shifting operation of the control mechanism of which the rod 25 forms a part. It is also to be noted that when the spring 29 has the preferred strength the detent constituted by the balls 21 will enter any groove 20 in the shaft, irrespective of whether or not such groove marks a limit to the axial adjustment of the gear-pair.

I claim as my invention:

1. In combination with a shifter-fork of a sliding-gear transmission, said fork having a hub, a stationary rail upon which said hub is slidably mounted, a sleeve axially slidable on said hub and adapted for connection to control means, means acting between said hub and sleeve and biasing them toward a normal relative position, a detent axially movable with said hub but radially slidable therein, said rail being provided with a plurality of axially spaced grooves alternatively engageable by said detent, said sleeve being provided interiorly with two axially spaced recesses separated by a land, said land being located in alignment with said detent when said hub and sleeve are in their normal relative position to prevent removal of the detent from a groove in said rail, and each of said recesses being located to be brought into alignment with said detent upon displacement of said sleeve from its normal position relative to said hub to permit the detent to move out of the groove in said rail.

2. The invention set forth in claim 1 with the addition of means positively limiting relative axial movement of said sleeve and hub in each direction from their normal relative position.

3. In a sliding-gear transmission, a gear movable axially of itself into any of a plurality of positions of adjustment, a shifter for so moving said gear, a stationary rail on which said shifter is slidably mounted, said rail being provided with a plurality of axially spaced grooves, a detent movable axially with said shifter and receivable in any of said grooves, each of said grooves and said detent having co-operating surfaces arranged to urge the detent outwardly of the groove when the shifter is urged axially, a retainer associated with said shifter and movable axially relative thereto in either direction from a normal position in which it engages said detent and prevents its removal from a groove in said rail, said retainer being arranged to permit detent-removal from a rail-groove when moved axially a predetermined distance in either direction from its normal position relative to said shifter, and means yieldingly opposing movement of said retainer in either direction from its normal position relative to said shifter, said detent and retainer having co-operating surfaces arranged to urge said detent toward said rail when said retainer is urged toward its said normal position, said retainer being adapted for connection to control means for moving it axially.

4. In a sliding-gear transmission, a gear movable axially of itself into any of a plurality of positions of adjustment, a shifter for so moving said gear, a stationary rail on which said shifter is slidably mounted, said rail being provided with a plurality of axially spaced grooves, a detent movable axially with said shifter and receivable in any of said grooves, each of said grooves and said detent having co-operating surfaces arranged to urge the detent outwardly of the groove when the shifter is urged axially, a retainer associated with said shifter and movable axially relative thereto in either direction from a normal position in which it engages said detent and prevents its removal from a groove in said rail, said retainer being arranged to permit detent-removal from a rail-groove when moved axially a predetermined distance in either direction from its normal position relative to said shifter, and means yieldingly opposing movement of said retainer in either direction from its normal position relative to said shifter, said retainer being adapted for connection to control means for moving it axially.

5. In a sliding-gear transmission, a gear movable axially of itself into any of a plurality of positions of adjustment, a shifter for so moving said gear, a stationary rail on which said shifter is slidably mounted, said rail being provided with a groove, a detent movable axially with said shifter and receivable in said groove, said groove and said detent having co-operating surfaces arranged to urge the detent outwardly of the groove when the shifter is urged axially, a retainer associated with said shifter and movable axially relative thereto from a normal position in which it engages said detent and prevents its removal from the groove in said rail, said retainer being arranged to permit detent-removal from the rail-groove when moved axially a predetermined distance from its normal position relative to said shifter, and means yieldingly opposing movement of said retainer from its normal position relative to said shifter, said detent and retainer having co-operating surfaces arranged to urge said detent toward said rail when said retainer is urged toward its said normal position, said retainer being adapted for connection to control means for moving it axially.

6. In a sliding-gear transmission, a gear movable axially of itself into any of a plurality of positions of adjustment, a shifter for so moving said gear, a stationary rail on which said shifter is slidably mounted, said rail being provided with a groove, a detent movable axially with said shifter and receivable in said groove, said groove and said detent having co-operating surfaces arranged to urge the detent outwardly of the groove when the shifter is urged axially, a retainer associated with said shifter and movable axially relative thereto from a normal position in which it engages said detent and prevents its removal from the groove in said rail, said retainer being arranged to permit detent-removal from the rail-groove when moved axially a predetermined distance from its normal position relative to said shifter, and means yieldingly opposing movement of said retainer from its normal position relative to said shifter, said retainer being adapted for connection to control means for moving it axially.

7. The invention set forth in claim 4 with the addition of means limiting the extent of relative axial movement of said shifter and detent-control member.

8. In a sliding-gear transmission, a gear movable axially of itself into any of a plurality of positions of adjustment, a shifter for so moving said gear, a stationary rail on which said shifter is slidably mounted, said rail being provided with a plurality of axially spaced grooves, a detent movable axially with said shifter and receivable in any of said grooves, each of said grooves and said detent having co-operating surfaces arranged to urge the detent outwardly of the groove when the shifter is urged axially, a control member movable axially of said rail, a retainer associated with said shifter and operatively connected to said control member to be moved thereby for a limited distance in either direction from a normal position in which it engages said detent to prevent its removal from a rail-groove, and means yieldingly opposing movement of said retainer from its normal position relative to said shifter.

9. In a sliding-gear transmission, a gear movable axially of itself into any of a plurality of positions of adjustment, a shifter for so moving said gear, a stationary rail on which said shifter is slidably mounted, said rail being provided with a plurality of axially spaced grooves, a detent movable axially with said shifter and receivable in any of said grooves, each of said grooves and said detent having co-operating surfaces arranged to urge the detent outwardly of the groove when the shifter is urged axially, a retainer axially movable with said shifter but capable of a limited axial movement thereto in either direction from a normal position, yielding means acting between said shifter and retainer opposing movement of said retainer in either direction from such normal position, said retainer being operatively connected to said detent to urge it toward said rail when said yielding means is urging the retainer toward such normal position and to hold the detent positively in one of said grooves when the retainer is in normal position, and transmission control means for moving said retainer axially.

10. In a sliding-gear transmission, a gear movable axially of itself into any of a plurality of positions of adjustment, a shifter for so moving said gear, a stationary rail on which said shifter is slidably mounted, said rail being provided with a plurality of axially spaced grooves, a detent movable axially with said shifter and receivable in any of said grooves, each of said grooves and said detent having co-operating surfaces arranged to urge the detent outwardly of the groove when the shifter is urged axially, a retainer associated with said shifter and movable axially relative thereto in either direction from a normal position in which it engages said detent and prevents its removal from a groove in said rail, said retainer being arranged to permit detent-removal from a rail-groove when moved axially a predetermined distance in either direction from its normal position relative to said shifter, transmission control means for moving said retainer axially, and yielding means operative when said retainer is out of its normal position and said detent is engaging said rail between grooves therein for urging the detent toward the rail and the retainer toward its normal position.

11. In combination, a slide-rail provided with a plurality of axially spaced grooves, a shiftable element slidably mounted on said rail, a detent movable axially with said element and receivable in any of said grooves, each of said grooves and said detent having co-operating surfaces arranged to urge the detent outwardly of the groove when the element is urged axially, a retainer axially movable with said element but capable of a limited axial movement thereto in either direction from a normal position, yielding means acting between said element and retainer opposing movement of said retainer in either direction from such normal position, said retainer being operatively connected to said detent to urge it toward said rail when said yielding means is urging the retainer toward such normal position and to hold the detent positively in one of said grooves when the retainer is in normal position, and control means for moving said retainer axially.

12. In combination, a slide-rail provided with a plurality of axially spaced grooves, a shiftable element slidably mounted on said rail, a detent movable axially with said element and receivable in any of said grooves, each of said grooves and said detent having co-operating surfaces arranged to urge the detent outwardly of the groove when the element is urged axially, a retainer associated with said element and movable axially relative thereto in either direction from a normal position in which it engages said detent and prevents its removal from a groove in said rail, said retainer being arranged to permit detent-removal from a rail-groove when moved axially a predetermined distance in either direction from its normal position relative to said element, control means for moving said retainer axially, and yielding means operative when said retainer is out of its normal position and said detent is engaging said rail between grooves therein for urging the detent toward the rail and the retainer toward its normal position.

13. In combination, a hub having an axial bore adapted to receive slidably a guide rail, a detent carried by said hub and movable radially of said bore, a retainer slidably mounted on said hub and movable axially in either direction from a normal position relative to said hub, said retainer being adapted for connection to an axially movable control member, said retainer being provided with an abutment which when the retainer is in such normal position engages said detent and limits its outward movement, said retainer also being provided on opposite axial sides of said abutment with reliefs either of which by axial movement of the retainer can be brought into alinement with said detent to permit its outward movement, and yielding means acting between said hub and retainer and opposing movement of the retainer in either direction from its normal position.

JOHN W. RHODES.